United States Patent
Basso et al.

(10) Patent No.: US 7,706,409 B2
(45) Date of Patent: Apr. 27, 2010

(54) SYSTEM AND METHOD FOR PARSING, FILTERING, AND COMPUTING THE CHECKSUM IN A HOST ETHERNET ADAPTER (HEA)

(75) Inventors: Claude Basso, Raleigh, NC (US); Jean Louis Calvignac, Raleigh, NC (US); Chih-Jen Chang, Apex, NC (US); Philippe Damon, Raleigh, NC (US); Natarajan Vaidhyanathan, Carrboro, NC (US); Fabrice Jean Verplanken, La Gaude (FR); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 11/096,365

(22) Filed: Apr. 1, 2005

(65) Prior Publication Data
US 2006/0221952 A1    Oct. 5, 2006

(51) Int. Cl.
*H04J 3/24* (2006.01)
(52) U.S. Cl. .................. 370/474; 370/476; 709/236
(58) Field of Classification Search .............. 370/389, 370/392, 471, 401, 429, 470, 474, 476; 714/746, 714/758, 799, 807; 709/230, 236
See application file for complete search history.

(56) References Cited

U.S. PATENT DOCUMENTS

| | | | |
|---|---|---|---|
| 1,724,198 A | 8/1929 | Hauser | |
| 4,825,406 A | 4/1989 | Bean et al. | |
| 5,058,110 A * | 10/1991 | Beach et al. | 370/464 |
| 5,172,371 A | 12/1992 | Eng et al. | |
| 5,359,659 A | 10/1994 | Rosenthal | |
| 5,430,842 A | 7/1995 | Thompson et al. | |
| 5,442,802 A | 8/1995 | Brent et al. | |
| 5,752,078 A | 5/1998 | Delp et al. | |
| 5,983,274 A | 11/1999 | Hyder et al. | |
| 5,991,299 A * | 11/1999 | Radogna et al. | 370/392 |
| 6,041,058 A * | 3/2000 | Flanders et al. | 370/401 |
| 6,266,700 B1 * | 7/2001 | Baker et al. | 709/230 |
| 6,400,730 B1 | 6/2002 | Latif et al. | |

(Continued)

FOREIGN PATENT DOCUMENTS

WO    03049488 A1    6/2003

OTHER PUBLICATIONS

Kung, H.T., Gigabit Local Area Networks: A System Perspective, Apr. 1992, IEE Communications Magazine, vol. 30, Issue 4, pp. 79-89.

(Continued)

*Primary Examiner*—Jason E Mattis
*Assistant Examiner*—Dady Chery
(74) *Attorney, Agent, or Firm*—Jason Piche; Jeffrey L. Streets (57) ABSTRACT

A system and method for parsing, filtering, and computing the checksum in a host Ethernet adapter (HEA) that is coupled to a host. The method includes receiving a part of a frame, wherein a plurality of parts of a frame constitute a entire frame. Next, parse the part of a frame before receiving the entire frame. The HEA computes a checksum of the part of a frame. The HEA filters the part of a frame based on a logical, port-specific policy and transmits the checksum to the host.

20 Claims, 6 Drawing Sheets

U.S. PATENT DOCUMENTS

| | | | |
|---|---|---|---|
| 6,427,169 B1 | 7/2002 | Elzur | |
| 6,650,640 B1* | 11/2003 | Muller et al. | 370/392 |
| 6,658,002 B1 | 12/2003 | Ross et al. | |
| 6,678,746 B1 | 1/2004 | Russell et al. | |
| 6,724,769 B1 | 4/2004 | Sang | |
| 6,728,929 B1 | 4/2004 | Luong | |
| 6,735,670 B1 | 5/2004 | Bronstein et al. | |
| 6,751,229 B1 | 6/2004 | Waller et al. | |
| 6,754,662 B1 | 6/2004 | Li | |
| 6,788,697 B1 | 9/2004 | Aweya et al. | |
| 6,795,870 B1 | 9/2004 | Bass et al. | |
| 6,822,968 B1 | 11/2004 | Lim | |
| 6,937,574 B1 | 8/2005 | Delaney et al. | |
| 6,954,463 B1 | 10/2005 | Ma et al. | |
| 6,970,419 B1 | 11/2005 | Kalkunte et al. | |
| 6,976,205 B1 | 12/2005 | Ziai et al. | |
| 6,988,235 B2* | 1/2006 | Brown | 714/758 |
| 7,023,811 B2 | 4/2006 | Pinto | |
| 7,031,304 B1 | 4/2006 | Arberg et al. | |
| 7,062,570 B2 | 6/2006 | Hong et al. | |
| 7,098,685 B1 | 8/2006 | Agrawal et al. | |
| 7,124,198 B2 | 10/2006 | Pinkerton | |
| 7,131,140 B1 | 10/2006 | O'Rourke et al. | |
| 7,134,796 B2 | 11/2006 | Anderson | |
| 7,164,678 B2 | 1/2007 | Connor | |
| 7,218,632 B1 | 5/2007 | Bechtolsheim et al. | |
| 7,251,704 B2* | 7/2007 | Solomon et al. | 710/316 |
| 7,254,138 B2 | 8/2007 | Sandstrom | |
| 7,260,120 B2 | 8/2007 | Kang et al. | |
| 7,269,661 B2 | 9/2007 | Ree et al. | |
| 7,271,706 B2 | 9/2007 | Lee et al. | |
| 7,274,706 B1 | 9/2007 | Nguyen et al. | |
| 7,283,528 B1 | 10/2007 | Lim et al. | |
| 7,286,557 B2 | 10/2007 | Feuerstraeter et al. | |
| 7,292,586 B2 | 11/2007 | Dewan et al. | |
| 7,292,591 B2* | 11/2007 | Parker et al. | 370/401 |
| 7,295,553 B2 | 11/2007 | Saitoh | |
| 7,298,761 B2 | 11/2007 | Hong | |
| 7,308,006 B1 | 12/2007 | Banerjee et al. | |
| 7,334,216 B2 | 2/2008 | Molina-Moreno et al. | |
| 7,349,399 B1 | 3/2008 | Chen et al. | |
| 7,360,217 B2 | 4/2008 | Melvin et al. | |
| 7,366,194 B2* | 4/2008 | Yu et al. | 370/429 |
| 2001/0027496 A1 | 10/2001 | Boucher et al. | |
| 2002/0048270 A1 | 4/2002 | Allen et al. | |
| 2003/0022792 A1 | 1/2003 | Hacker et al. | |
| 2003/0026252 A1 | 2/2003 | Thunquest et al. | |
| 2003/0088689 A1 | 5/2003 | Alexander et al. | |
| 2003/0103499 A1 | 6/2003 | Davis et al. | |
| 2003/0154399 A1 | 8/2003 | Zuk et al. | |
| 2004/0022094 A1 | 2/2004 | Radhakrishnan et al. | |
| 2004/0030766 A1 | 2/2004 | Witkowski | |
| 2004/0064590 A1 | 4/2004 | Starr et al. | |
| 2004/0081145 A1 | 4/2004 | Harrekilde-Petersen et al. | |
| 2004/0100952 A1 | 5/2004 | Boucher et al. | |
| 2004/0109465 A1 | 6/2004 | Kim et al. | |
| 2004/0128398 A1 | 7/2004 | Pettey | |
| 2004/0177275 A1* | 9/2004 | Rose et al. | 713/201 |
| 2004/0218623 A1 | 11/2004 | Goldenberg et al. | |
| 2005/0022017 A1 | 1/2005 | Maufer et al. | |
| 2005/0076136 A1 | 4/2005 | Cho et al. | |
| 2005/0089031 A1 | 4/2005 | Krueger | |
| 2005/0108611 A1* | 5/2005 | Vogt | 714/758 |
| 2005/0114663 A1 | 5/2005 | Cornell et al. | |
| 2005/0120160 A1 | 6/2005 | Plouffe et al. | |
| 2005/0149677 A1 | 7/2005 | Shimada et al. | |
| 2005/0174153 A1 | 8/2005 | Saeki | |
| 2005/0256975 A1* | 11/2005 | Kaniz et al. | 709/250 |
| 2006/0031600 A1 | 2/2006 | Ellis et al. | |
| 2006/0120289 A1 | 6/2006 | Cunningham | |
| 2006/0187928 A1 | 8/2006 | McGee et al. | |
| 2006/0216958 A1 | 9/2006 | Yee et al. | |

OTHER PUBLICATIONS

Cunningham, D.G., The Status of the 10-Gigabit Ethernet Standard, 2001, 27th European Conference on Optical Communication, 2001. ECOC '01, vol. 3, pp. 364-367.

IP Com, Reusing a 10Gbps Ethernet Media Access Controller for a 1Gbps/100Mbps Ethernet, at www.ip.com, IP.com No. IPCOM000133402D, Jan. 25, 2006, 6 pages.

Adolf, Geier, Patent Cooperation Treaty: PCT Notification of transmittal of the International Preliminary Report on Patentability (PCT Rule 71.1), European Patent Office, Apr. 13, 2007, 7 pages.

Rummery, Audrey, Patent Cooperation Treaty: PCT Notification of Transmittal of the International Search Report and the Written Opinion of the International Searching Authority, or the Declaration (PCT Rule 44.1), European Patent Office, Jul. 5, 2006, 11 pages.

Braden, Computing the Internet Checksum, RFC 1071, Sep. 1988.

Rijsinghani, Computing the Internet Checksum via Incremental Update, RFC 1624, May 1994.

Touch, Implementing the Internet Checksum in Hardware, RFC 1936, Apr. 1996.

Mazzucco, The Fundamentals of Cache, SystemLogic.Net, Oct. 17, 2000.

Balena, F., "Speed up searched with hash tables," Nov. 13, 2001, DevX.com all pages.

Acayan, Joseph, "Facsimile Transmital", Apr. 22, 2008, Sayer Law Group, LLP, 1 page.

* cited by examiner

IPv4 Header field offsets as a function of layer-2 length/encapsulations

| | L2 Length | ver/IHL/Tos | Total Length | Ident | flags & FO | TTL & prot | chksum | SAh | SAl | DAh | DAl |
|---|---|---|---|---|---|---|---|---|---|---|---|
| DIX, untag | 14 | 0,7 | 1,0 | 1,1 | 1,2 | 1,3 | 1,4 | 1,5 | 1,6 | 1,7 | 2,0 |
| SNAP, untag | 22 | 1,3 | 1,4 | 1,5 | 1,6 | 1,7 | 2,0 | 2,1 | 2,2 | 2,3 | 2,4 |
| Dix, tag | 18 | 1,1 | 1,2 | 1,3 | 1,4 | 1,5 | 1,6 | 1,7 | 2,0 | 2,1 | 2,2 |
| SNAP, tag | 26 | 1,5 | 1,6 | 1,7 | 2,0 | 2,1 | 2,2 | 2,3 | 2,4 | 2,5 | 2,6 |

TCP Header field offsets as a function of layer-2 length/options

| Field/IHL -> | 5 | 6 | 7 | 8 | 9 | 10 | 11 | 12 | 13 | 14 | 15 |
|---|---|---|---|---|---|---|---|---|---|---|---|
| TCP SP | | | | | | | | | | | |
| L2 len 14 | 2,1 | 2,3 | 2,5 | 2,7 | 3,1 | 3,3 | 3,5 | 3,7 | 4,1 | 4,3 | 4,5 |
| L2 len 22 | 2,5 | 2,7 | 3,1 | 3,3 | 3,5 | 3,7 | 4,1 | 4,3 | 4,5 | 4,7 | 5,1 |
| L2 len 18 | 2,3 | 2,5 | 2,7 | 3,1 | 3,3 | 3,5 | 3,7 | 4,1 | 4,3 | 4,5 | 4,7 |
| L2 len 26 | 2,7 | 3,1 | 3,3 | 3,5 | 3,7 | 4,1 | 4,3 | 4,5 | 4,7 | 5,1 | 5,3 |
| TCP DP | | | | | | | | | | | |
| L2 len 14 | 2,2 | 2,4 | 2,6 | 3,0 | 3,2 | 3,4 | 3,6 | 4,0 | 4,2 | 4,4 | 4,6 |
| L2 len 22 | 2,6 | 3,0 | 3,2 | 3,4 | 3,6 | 4,0 | 4,2 | 4,4 | 4,6 | 5,0 | 5,2 |
| L2 len 18 | 2,4 | 2,6 | 3,0 | 3,2 | 3,4 | 3,6 | 4,0 | 4,2 | 4,4 | 4,6 | 5,0 |
| L2 len 26 | 2,6 | 3,0 | 3,2 | 3,4 | 3,6 | 4,0 | 4,2 | 4,4 | 4,6 | 5,0 | 5,2 |
| Seqno High | | | | | | | | | | | |
| L2 len 14 | 2,3 | 2,5 | 2,7 | 3,1 | 3,3 | 3,5 | 3,7 | 4,1 | 4,3 | 4,5 | 4,7 |
| L2 len 22 | 2,7 | 3,1 | 3,3 | 3,5 | 3,7 | 4,1 | 4,3 | 4,5 | 4,7 | 5,1 | 5,3 |

FIG.5

| | | | | | | | | | | |
|---|---|---|---|---|---|---|---|---|---|---|
| L2 len 18 | 2,5 | 2,7 | 3,1 | 3,3 | 3,5 | 3,7 | 4,1 | 4,3 | 4,5 | 4,7 | 5,1 |
| L2 len 26 | 3,1 | 3,3 | 3,5 | 3,7 | 4,1 | 4,3 | 4,5 | 4,7 | 5,1 | 5,3 | 5,5 |
| Seqno Low | | | | | | | | | | | |
| L2 Len 14 | 2,4 | 2,6 | 3,0 | 3,2 | 3,4 | 3,6 | 4,0 | 4,2 | 4,4 | 4,6 | 5,0 |
| L2 Len 22 | 3,0 | 3,2 | 3,4 | 3,6 | 4,0 | 4,2 | 4,4 | 4,6 | 5,0 | 5,2 | 5,4 |
| L2 Len 18 | 2,6 | 3,0 | 3,2 | 3,4 | 3,6 | 4,0 | 4,2 | 4,4 | 4,6 | 5,0 | 5,2 |
| L2 Len 26 | 3,2 | 3,4 | 3,6 | 4,0 | 4,2 | 4,4 | 4,6 | 5,0 | 5,2 | 5,4 | 5,6 |
| AckNo Hi | | | | | | | | | | | |
| L2 Len 14 | 2,5 | 2,7 | 3,1 | 3,3 | 3,5 | 3,7 | 4,1 | 4,3 | 4,5 | 4,7 | 5,1 |
| L2 Len 22 | 3,1 | 3,3 | 3,5 | 3,7 | 4,1 | 4,3 | 4,5 | 4,7 | 5,1 | 5,3 | 5,5 |
| L2 Len 18 | 2,7 | 3,1 | 3,3 | 3,5 | 3,7 | 4,1 | 4,3 | 4,5 | 4,7 | 5,1 | 5,3 |
| L2 Len 26 | 3,3 | 3,5 | 3,7 | 4,1 | 4,3 | 4,5 | 4,7 | 5,1 | 5,3 | 5,5 | 5,7 |
| AckNo Low | | | | | | | | | | | |
| L2 Len 14 | 2,6 | 3,0 | 3,2 | 3,4 | 3,6 | 4,0 | 4,2 | 4,4 | 4,6 | 5,0 | 5,2 |
| L2 Len 22 | 3,2 | 3,4 | 3,6 | 4,0 | 4,2 | 4,4 | 4,6 | 5,0 | 5,2 | 5,4 | 5,6 |
| L2 Len 18 | 3,0 | 3,2 | 3,4 | 3,6 | 4,0 | 4,2 | 4,4 | 4,6 | 5,0 | 5,2 | 5,4 |
| L2 Len 26 | 3,4 | 3,6 | 4,0 | 4,2 | 4,4 | 4,6 | 5,0 | 5,2 | 5,4 | 5,6 | 6,0 |
| hdrlengths(4)flags (SYN) | | | | | | | | | | | |
| L2 Len 14 | 2,7 | 3,1 | 3,3 | 3,5 | 3,7 | 4,1 | 4,3 | 4,5 | 4,7 | 5,1 | 5,3 |
| L2 Len 22 | 3,3 | 3,5 | 3,7 | 4,1 | 4,3 | 4,5 | 4,7 | 5,1 | 5,3 | 5,5 | 5,7 |
| L2 Len 18 | 3,1 | 3,3 | 3,5 | 3,7 | 4,1 | 4,3 | 4,5 | 4,7 | 5,1 | 5,3 | 5,5 |
| L2 Len 26 | 3,5 | 3,7 | 4,1 | 4,3 | 4,5 | 4,7 | 5,1 | 5,3 | 5,5 | 5,7 | 6,1 |
| window size | | | | | | | | | | | |
| L2 Len 14 | 3,0 | 3,2 | 3,4 | 3,6 | 4,0 | 4,2 | 4,4 | 4,6 | 5,0 | 5,2 | 5,4 |
| L2 Len 22 | 3,4 | 3,6 | 4,0 | 4,2 | 4,4 | 4,6 | 5,0 | 5,2 | 5,4 | 5,6 | 6,0 |
| L2 Len 18 | 3,2 | | | | | | | | | | |
| L2 Len 26 | 3,6 | | | | | | | | | | |
| TCP checksum | | | | | | | | | | | |
| L2 Len 14 | 3,1 | 3,3 | 3,5 | 3,7 | 4,1 | 4,3 | 4,5 | 4,7 | 5,1 | 5,3 | 5,5 |
| L2 Len 22 | 3,5 | 3,7 | 4,1 | 4,3 | 4,5 | 4,7 | 5,1 | 5,3 | 5,5 | 5,7 | 6,1 |
| L2 Len 18 | 3,3 | 3,5 | 3,7 | 4,1 | 4,3 | 4,5 | 4,7 | 5,1 | 5,3 | 5,5 | 5,7 |

FIG.6

SYSTEM AND METHOD FOR PARSING, FILTERING, AND COMPUTING THE CHECKSUM IN A HOST ETHERNET ADAPTER (HEA)

FIELD OF THE INVENTION

The present invention relates to adapters for parsing Ethernet packets generally, and specifically to a system and method for parsing, filtering and computing the Internet checksum in a host Ethernet adapter (HEA).

CROSS-REFERENCE TO RELATED APPLICATIONS

U.S. patent application Ser. No. 11/097,608, entitled "Host Ethernet Adapter for Networking Offload in Server Environment", filed on even date herewith and assigned to the assignee of the present invention.

U.S. patent application Ser. No. 11/096,363, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application Ser. No. 11/096,571, entitled "Method and Apparatus for Providing a Network Connection Table", filed on even date herewith and assigned to the assignee of the present invention.

U.S. patent application Ser. No. 11/097,051, entitled "Network Communications for Operating System Partitions", filed on even date herewith and assigned to the assignee of the present invention.

U.S. patent application Ser. No. 11/097,652, entitled "Configurable Ports for a Host Ethernet Adapter", filed on even date herewith and assigned to the assignee of the present invention.

U.S. patent application Ser. No. 11/096,353, entitled "System and Method for a Method for Reducing Latency in a Host Ethernet Adapter (HEA)", filed on even date herewith and assigned to the assignee of the present invention.

U.S. patent application Ser. No. 11/097,055. entitled "Method and Apparatus for Blind Checksum and Correction for Network Transmissions", filed on even date herewith and assigned to the assignee of the present invention.

U.S. patent application Ser. No. 11/096,362, entitled "Method and system for Performing a Packet Header Lookup", filed on even date herewith and assigned to the assignee of the present invention.

U.S. patent application Ser. No. 11/097,430, entitled "system and Method for Computing a Blind Checksum in a Host Ethernet Adapter (HEA)", filed on even date herewith and assigned to the assignee of the present invention.

Adapters typically receive and store frames over a network. After a frame is received, it may be passed along, opened, filtered and checked for validity. One problem with this is that it may take some time to receive the entire frame, then begin the work of parsing, filtering and checking validity.

BACKGROUND OF THE INVENTION

A computer, or host, connects to a network through an adapter that parses, or separates, each frame received over the network. The adapter may be known as a host Ethernet adapter (HEA).

Adapters typically receive and store frames over a network. After a frame is received, it may be passed along, opened, filtered and checked for validity. One problem with this is that it may take some time to receive the entire frame, then begin the work or parsing, filtering and checking validity.

Accordingly, what is needed is a system and method for parsing, filtering and computing the checksum in a host Ethernet adapter (HEA). The present invention addresses such a need.

BRIEF SUMMARY OF THE INVENTION

The present invention provides a system and method for parsing, filtering, and computing the checksum in a host Ethernet adapter (HEA) that is coupled to a host. The method includes receiving a part of a frame, wherein a plurality of parts of a frame constitute an entire frame. Next, parse the part of a frame before receiving the entire frame. The HEA computes a checksum of the part of a frame. The HEA filters the part of a frame based on a logical, port-specific policy and transmits the checksum to the host.

The HEA computes a checksum of some of the bytes of the part of a frame and updates a running checksum. The HEA filters the frame based on a logical, port-specific policy and transmits the checksum to the host.

DETAILED DESCRIPTION OF THE INVENTION

The present invention relates to a system and method for parsing, filtering, and computing the checksum of a host Ethernet adapter (HEA). The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
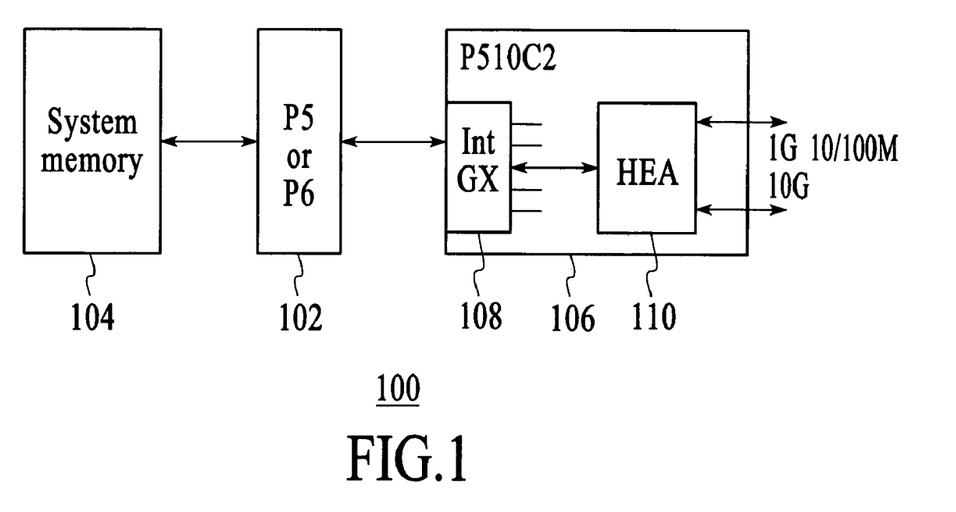
FIG. 1 is a block diagram of a server system in accordance with the present invention.

FIG. 1 is a block diagram of a server system 100 in accordance with the present invention. The server system 100 includes a processor 102 that is coupled between a memory 104 and an interface adapter chip 106. The interface adapter chip 106 includes an interface 108 to the private (Gx) bus of the processor 102 and a Host Ethernet Adapter (HEA) 110. The HEA 110 receives and transmits signals from and to the processor 102.

The HEA 110 is an integrated Ethernet adapter. A set of accelerator features are provided such that a TCP/IP stack within the servers uses those features when and as required. The interface between the processor 102 and the interface adapter chip 106 has been streamlined by bypassing the PCI bus and providing interface techniques that enable demultiplexing and multiqueueing and packet header separation. In so doing an Ethernet adapter is provided that allows for improved functionality with a high-speed system while allowing for compatibility with legacy server environments. Some of the key features of this improved functionality are described hereinbelow.

Acceleration Functions

The HEA 110 supports advanced acceleration features. One key observation is that the current acceleration functions do a good job on the transmit side (ie transmitting packets from the processor) but not a very good job on the receive side (ie receiving packets via the adapter). The HEA 110 addresses this gap by introducing new features such as Packet Demultiplexing and Multiqueueing, and Header separation.

All of the HEA 110 new features are optional; it is up to the TCP/IP stack to take advantage of them if and when required. For example, a vanilla TCP/IP stack can use the HEA 110 without using per the connection queueing feature and yet take advantage of the other features of HEA such as throughput, low latency and virtualization support.

Packets Demultiplexing and Multiqueueing

Multiqueueing and Demultiplexing is the key feature to support functions such as virtualization, per connection queueing, and OS bypass. HEA demultiplexing uses the concept of Queue Pairs, Completion Queues and Event Queues. Enhancements have been added to better address OS protocol stacks requirements and short packet latency reduction.

Depending upon system requirements and configuration, HEA can demultiplex incoming packets based on:

Destination MAC address (typically one MAC address and one default queue per partition)

Connection identifier (ID) for established connections (Protocol, Source IP address, Destination IP address, Source port, Destination port).

Destination port and optionally destination IP address for TCP connection setup packet (SYN).

Packet Header Separation

The HEA 110 is optionally capable of separating the TCP/IP header from the data payload. This feature allows the header to be directed to the protocol stack for processing without polluting the received buffers posted by the applications. This feature is a component required for enabling zero-copy operations.

Enhanced Features

Many enhanced features are provided by the HEA 110 in the server environment. Some of these features are listed below.

(a) Multiple Receive Queue: The queue pair concept is extended to support more than one receive queue per pair. This enables the stack to better manage its buffer pool memory. For example, one queue can be assigned to small packets, one to medium packets and one to large packets. The HEA will select the ad hoc queue according to the received packet size.

(b) Low Latency Queue: On the transmit side a descriptor (WQE) may contain immediate data, in such case no indirection, i.e., no additional DMA from system memory is required to get the data to be sent. On the receive side, low latency queues doe not supply buffers but rather receive immediate packet data. The HEA writes to the receive queue rather than reading. Short packets take advantage of this feature leading to a dramatic reduction of DMA operations: one single DMA write per packet as opposed to one DMA read and one DMA write per packet.

(c) Receive low latency queues are also used to support the packet header separation: the header is written in the low latency queue while the payload is DMAed to a buffer indicated in the ad-hoc receive queues.

In summary, Demultiplexing and Multiqueueing, Address Translation and Packet Header Separation are the basic building blocks to virtualization and provide low latency in operation. Furthermore, it should be noted that these features can also be used to improve traditional OS protocol stack performance, for example, per-connection queueing allows for the removal of code and more importantly the memory accesses—and associated stalls/cache pollution—consumed to locate the TCP connection control block (TCB) in the system memory.

To describe the features of the HEA 110 in more detail refer now to the following description in conjunction with the accompanying figures.

Figure 2:
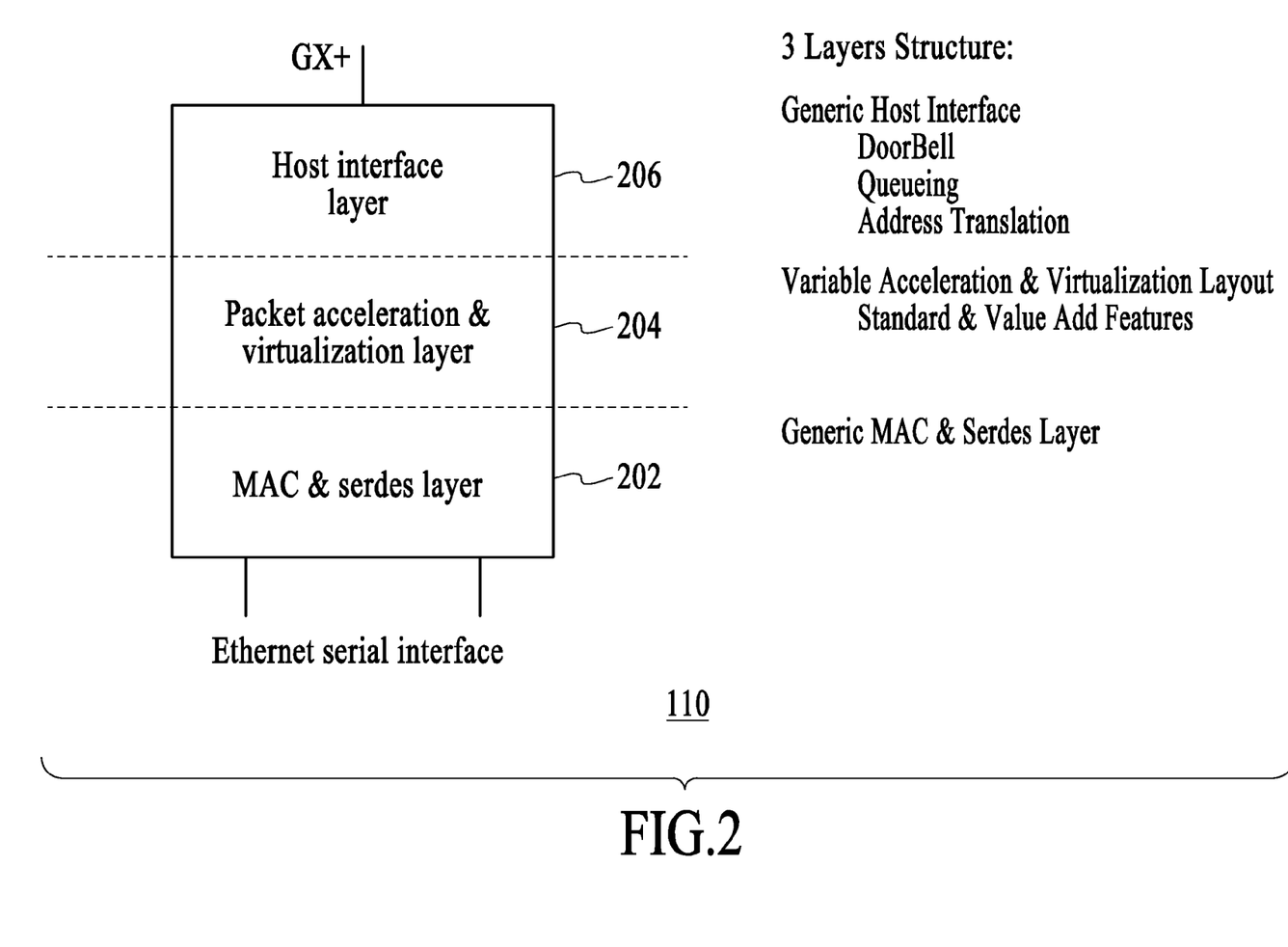
FIG. 2 is a simple block diagram of the HEA in accordance with the present invention.

FIG. 2 is a simple block diagram of the HEA 110 in accordance with the present invention. As is seen the HEA 110 has a three-layer architecture. The first layer comprises a Media Access Controller (MAC) and Serialization/Deserialization (Serdes) Layer 202, which provides a plurality of interfaces from and to other devices on the Ethernet network. In the layer 202 the same chip I/Os are used to provide a plurality of interfaces. For example, in a preferred embodiment, the same chip I/Os are utilized to provide either a 10 Gigabit interface or a 1 Gigabit interface.

The second layer comprises a Packet Acceleration and Virtualization Layer 204. The layer 204 provides for receiving packets and demultiplexing the flow of packets for enabling virtualization. The layer 204 enables virtualization or partitioning of the operating system of a server based upon the packets. The layer 204 also provides packet header separation to enable zero copy operation. Also since layer 204 interacts directly with the private bus (Gx) through the Host Interface Layer 206, a low latency, high bandwidth connection is provided.

The third layer comprises the Host Interface Layer 206. The Host Interface Layer 206 provides the interface to the Gx or private bus of the processor. The layer 206 provides for multiple receive sub-queues per Queue Pair (QP) to enable effective buffer management for a TCP stack. The host layer 206 provides the context management for a given flow of data packets.

Figure 3:
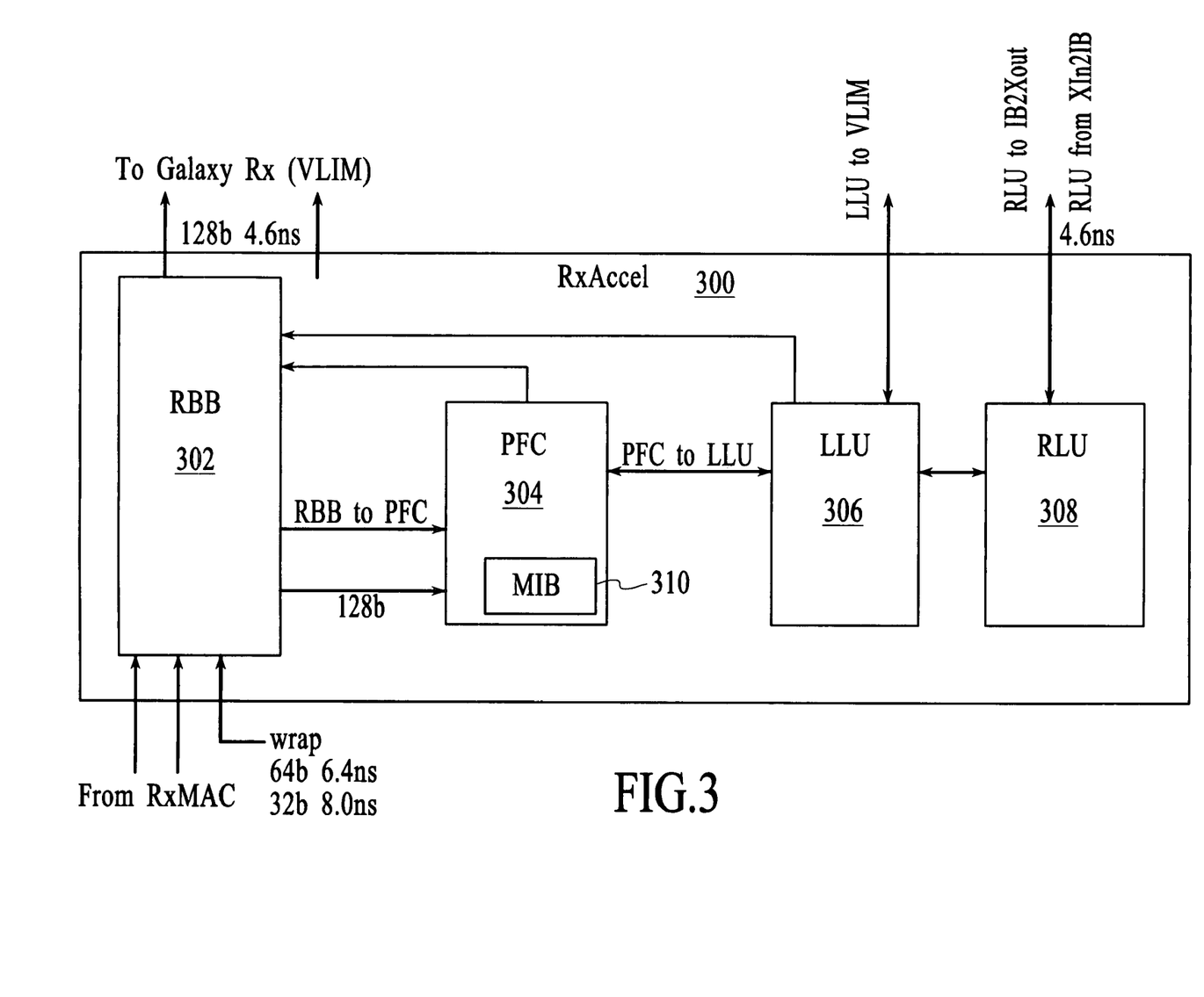
FIG. 3 illustrates one embodiment of the invention in a RxAccel unit, which is a part of packet acceleration and virtualization layer from FIG. 2.

FIG. 3 illustrates one embodiment of the invention in a RxAccel unit 300, which is a part of layer 204 (see FIG. 2). The RxAccel 300 receives data and control signals and performs parsing, filtering, checksum and lookup functions in preparation for processing by the host interface layer 206 (FIG. 2). The RxAccel 300 is composed of a Receive Backbone (RBB) 302, the Parser, Filter and Checksum Unit (PFC) 304, the Local Lookup Unit (LLU) 306, the Remote Lookup Unit (RLU) 308 and an MIB database 310.

Data flows through the RxAccel 300 from the RxMAC (not shown) unaltered. The RBB 302 manages the flow of data and is responsible for the clock and data bus width conversion functions. Control and data received from the RxMAC is used by the PFC 304 to perform acceleration functions and to make a discard decision. The PFC 304 passes control and data extracted from the frame, including the 5-tuple key, to the LLU 306 in order to resolve a Queue Pair nunper (QPN) for the RBB 302. The LLU 306 either finds the QPN immediately or allocates a cache entry to reserve the slot. If the current key is not in the cache, the LLU 306 searches for the key in memory. The PFC 304 interfaces to the MIB database 310 to store packet statistics.

Figure 4:
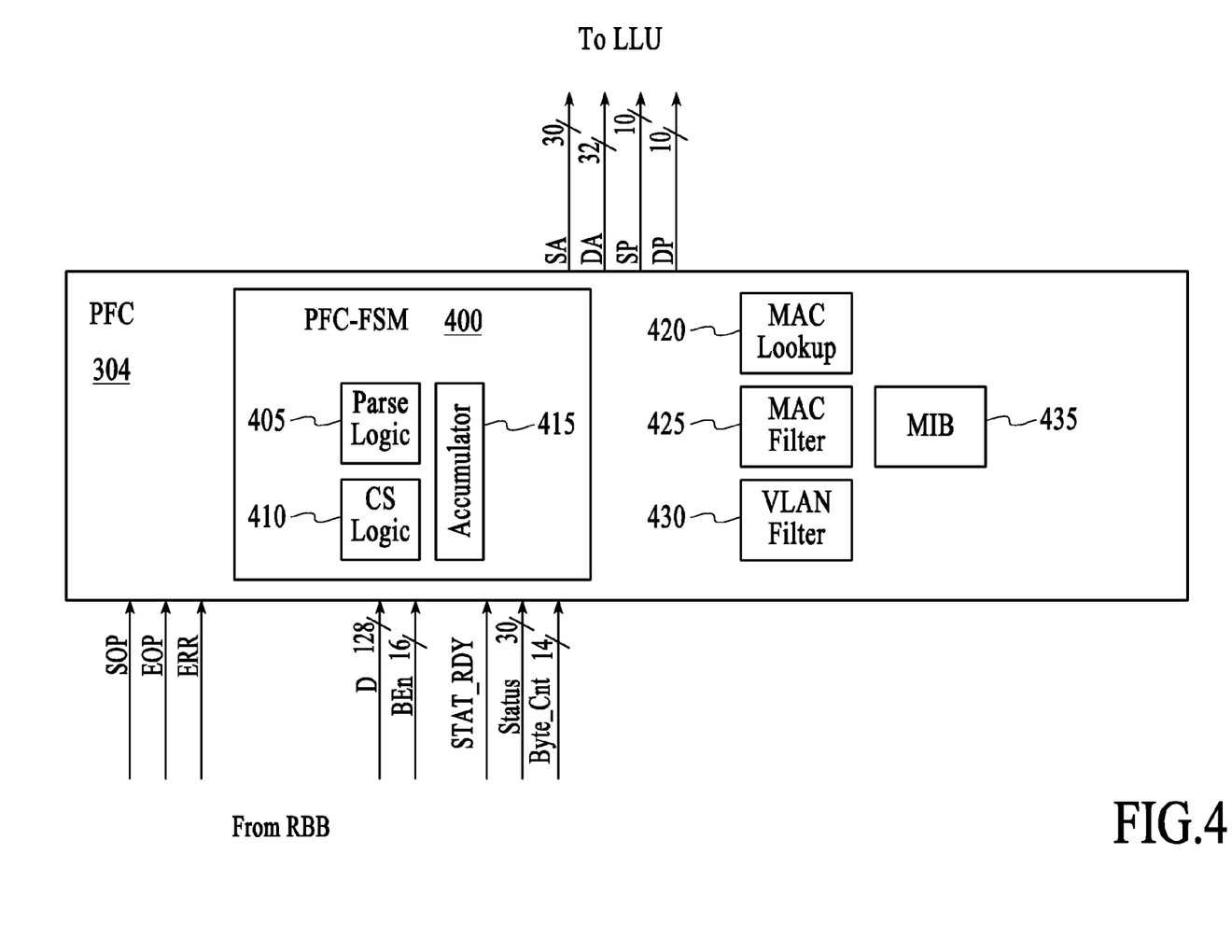
FIG. 4 is a diagram illustrating one embodiment of the PFC from FIG. 3.

FIG. 4 is a diagram illustrating one embodiment of PFC 304 from FIG. 3. The PFC 304 includes a PFC-Finite State Machine (FSM) 400 composed of subunits for a parse logic unit 405, a checksum (CS) logic unit 410, and an accumulator 415. The PFC-FSM 400 controls the PFC 304 and performs packet parsing and checksum functions. A MAC lookup 420 performs a lookup on the MAC destination address (DA). If a lookup on the MAC DA is found, various per-MAC flags are also found. A MAC filter 425 performs filtering on multicast packets. A virtual local area network (VLAN) filter 430 performs VLAN filtering. A MIB 435 measures performance in the PFC 400. Status information from the MAC and from the PFC 400 are sent for each packet to the MIB 435. Discard decisions based on the results from the above units are made by the PFC-FSM 400. The specifics of filtering and parsing are discussed below.

One aspect of the invention with respect to filtering, virtualization, is applied through VLAN filter 430. Rather than limiting a filter to one global policy for each adapter, VLAN filter 430 may apply a different filter for each logical partition (not shown) in the server system 100. Logical partitions may be parts of a single memory storage area (not shown), for example a hard disk drive, that are divided into different parts and appear to other systems and software as separate storage areas. Packets may be directed to these different logical partitions in the server system 100, and different criteria (or filter policy) may be used to determine whether a given packet is sent to the intended partition or not. Next, filtering in general is discussed after an introduction to data flow to the PFC.

Each frame, or packet, (not shown) received by HEA 110 may a different length, for example 5,000, 7,400 and 9,000 bits long. However, HEA 110 receives only a certain number of those bits at a time, for example up to 128 bits. In order to increase performance, PFC 304 performs "on-the-fly" parsing, filtering, and computing checksums, meaning that for each part of the entire frame that is received (for example, each block of 128 bits), PFC 304 is taking steps to parse, filter and compute the checksum of the frame so that by the time the last part of the frame is received, PFC 304 may perform, on the last part of the frame received, the last parsing, filtering and computing of the checksum that is needed for the entire frame. This saves significant time over conventional systems that do not begin those processes until after receiving the entire frame.

So each clock cycle, PFC 304 should be able to handle 128 bits. The fewest number of bits expected before filtering should begin (based on the IPv4, TCP/UDP standard) is 384. Therefore, PFC 304 must be ready to filter after as few as three clock cycles (512/128=3). Examples of pre-filtering processing performed in these clock cycles is described below.

After receiving the first 128 bits in a frame, (referred to generally as quadword or QW), in the first clock cycle the PFC 304 reads the physical-port specific policies. Then, MAC lookup 420 receives the DA MAC and may determine a logical port destination for the packet. A DA MAC hash is then formed.

In the second clock cycle, PFC 304 reads and loads into registers any logical-port specific policies looked up in the first clock cycle. Then, the PFC 304 uses the DA MAC hash and the source port for the frame to read the MAC filter policy.

In the third clock cycle, PFC 304 reads and loads into VLAN 430 the virtual LAN policy. By the fourth clock cycle, all of the filtering policies are available in the appropriate registers and PFC 304 is ready to begin filtering.

Although filtering is discussed prior to parsing, some of the steps in filtering follow steps in parsing, or are performed simultaneously with parsing. One of ordinary skill in the art will recognize that some information used in filtering must first be parsed from a frame.

Having discussed filtering in the PFC 304, parsing is discussed in the following description. An algorithm is presented in Very high-speed integrated circuit Hardware Description Language (VHDL), which is an IEEE standard, in order to help with the explanation of parsing. The algorithm may be used for parsing, for example, data in IPv4, TCP/UDP.

Along with the 128 bits (potentially) of each frame that the PFC 400 receives, the following inputs, for example, are also received:

1. Ext_Rdy: 1 bit: RBB is giving valid data during this cycle.
2. SOP: 1 bit: Start of Packet/Frame—Indicates whether the QW (up to 128 bits) is the start of the Frame
3. EOP: 1 bit: End of Packet/Frame—Indicates whether the QW (up to 128 bits) is the end of the Frame
4. Data: 128 bits: 16 bytes of data (or the potentially 128 bits, or QW) belonging to the frame. If SOP is true, these are the first 16 bytes, if EOP is true, then these are the last bytes. Meaning full only if Ext_Rdy is true, meaning this is valid data
5. BEn: 5 bits: Number of most significant valid bytes, meaningful only if EOP is true, if EOP is not true, this is implicitly 16. Most groups will contain the full 128 bits, but at the end of the packet, fewer than 128 bits may be sent and the PFC 304 needs to know how many are being sent
6. Stat_rdy: 1 bit: Status information is valid, (Ext_rdy need not be true). Indicates that the data is not corrupted.
7. ByteCnt: 14 bits: Length of the frame, meaningful only if Stat_rdy is true
8. Status: 27 bits: status of the frame, meaningful only if Stat_rdy is true.

After parsing, parse logic unit 405 will output the following:

Certain info about the layer 2 (ethernet header): Unicast/Broadcast/Multicast, VLAN Id, VLAN tagged?

Certain fields of IP header like IP SA (Source Address) and IP DA (Destination address)

Certain fields of TCP/UDP header like SP and DP (Source Port, Destination Port)

The most significant 16 bits of Data will be denoted by half-word (hw) 0 and the next 16 bits of data by hw1 and so on, The last 16 bits being hw7. Eight half-words making up the four QW of the data input to PFC 304 each cycle.

Each paragraph of bold text (referred to as "process") describes a latch or register. There are two kinds of names derived from the same stem. For example, from the word "Step", we have PFC_Step_O and PFC_C_Step, i.e. one with _O and one with _C. The one with _O is the value in the register/latch in the current cycle. The one with _C will be the value of the register/latch in the next cycle.

The parsing algorithm:

```
if EXT_Rdy = '1' and Stat_rdy= '0' then PFC_C_Step <=
   PFC_Step_O + 1;
   elsif Stat_rdy= '1'      then PFC_C_Step <= 0;
   else                     PFC_C_Step <= PFC_Step_O;
   end if;
```

The function of the above process is a counter (not shown) that is incremented each time a QW of data is received by the PFC 304. The counter is reset to 0 when Stat_rdy is received. 'Step' represents the number of quadwords given to PFC in the current frame under process. This process keeps track of the part of the frame that the PFC 304 is receiving.

The following short hand notation is used in the description of the algorithm:

PFC_WS0 to mean the boolean condition PFC_Step_O=0 and Ext_Rdy='1'

PFC_WS1 to mean the boolean condition PFC_Step_O=1 and Ext_Rdy='1'

PFC_WS2 to mean the boolean condition PFC Step O=2 and Ext_Rdy='1'

PFC_WS3 to mean the boolean condition PFC_Step_O=3 and Ext_Rdy='1'

PFC_WSgt1 to mean the boolean condition (PFC_Step_O>1) and Ext_Rdy='1'

PFC_WSgt2 to mean the boolean condition (PFC_Step_O>2) and Ext_Rdy='=1'

Another segment of the algorithm is:

```
if PFC_WS0 = '1' and hw6 <= 1536 and hw7 = 0xaaaa then
    PFC_C_LLCaaaa <= '1';
elsif PFC_WS0 = '1' then
    PFC_C_LLCaaaa <= '0'; -- inter frame reset
else
    PFC_C_LLCaaaa <= PFC_LLCaaaa_O;
end if;
```

The function of the above process is that by examining the first QW, PFC detects whether the frame is in LLC format (i.e. not DIX). If the last hw contains "aaaa", the frame may be a LLC/SNAP frame. If the last hw contains "aaaa," then a bit is set that will be checked with the next hw to determine if is a LLC/SNAP frame (if it hasn't already been determined). By checking a qualifier in one hw (for example, the requirement for "aaaa") and setting a single bit, the PFC 304 avoids having to store the entire sequence while checking another hw.

Continuing with the algorithm:

```
if PFC_WS0 = '1' then    PFC_C_VLAN_ID <= hw7(11 downto 0);
else            PFC_C_VLAN_ID <= PFC_VLAN_ID_O;
end if;
```

The function of the above process is to get the VLAN identifier for VLAN filtering by the VLAN filter 430.

Continuing with the algorithm:

```
if PFC_WS0 = '1' and hw0(8) = '1' then    PFC_C_MAC_MC <= '1';
elsif PFC_WS0 = '1' then    PFC_C_MAC_MC <= '0'; -- inter
        frame reset
else
    PFC_C_MAC_MC <= PFC_MAC_MC_O;
end if;
```

The function of the above process is to detect whether the frame is a multicast frame (a type of frame). The lease significant bit of the most significant byte of the first QW (i.e. the eighth bit of the first byte in the first QW) of a frame received provides this information. MAC filter 425 performs filtering on multicast frames. If the frame is not a multicast frame (broadcast is a type of multicast frame), then it is assumed the frame is unicast.

Continuing with the algorithm:

```
if PFC_WS0 = '1' and hw0 = 0xffff and hw1 = 0xffff and hw2 = 0xffff
then
    PFC_C_MAC_BC <= '1';
elsif PFC_WS0 = '1' then
    PFC_C_MAC_BC <= '0'; -- inter frame reset
    else
    PFC_C_MAC_BC <= PFC_MAC_BC_O ;
```

The function of the above process is to detect whether the frame is a broadcast frame. If the most significant 48 bits of the first QW received is all 1's, then the frame is an Ethernet broadcast frame.

Continuing with the algorithm:

```
if     PFC_WS0 = '1' and hw6 = 0x8100    then PFC_C_tag <= '1';
elsif PFC_WS0 = '1'                      then PFC_C_tag <= '0';
    -- inter frame reset
else                                     PFC_C_tag <=
PFC_tag_O;
end if;
```

The function of the above process is to determine if a frame is VLAN tagged. A frame is VLAN tagged if the hw6 of the first QW (bits 20-24) received by PFC 400 is 0x8100.

Continuing with the algorithm:

```
if (PFC_WS0 = '1' and PFC_C_tag = '0' and hw6 >= 1536) then
    PFC_C_DIX <= '1';
elsif (PFC_WS1 = '1' and PFC_C_tag = '1' and hw0 >= 1536) then
    PFC_C_DIX <= '1';
elsif PFC_WS0 = '1' then    PFC_C_DIX <= '0'; -- inter frame reset
else                        PFC_C_DIX <= PFC_DIX_O;
end if;
```

The function of the above process is to check whether the current Ethernet frame's layer-2 header is in DIX format. If the Ethertype/Length field in the Ethernet header is =1536 then the layer-2 header is in DIX format. This Ethertype/length field could be present in hw6 of QW 0 for non-VLAN tagged frames and in hw1 of QW 1 for VLAN-tagged frames. So the location of the Ethertype/Length field depends on whether the frame is VLAN tagged or not, parsed during the immediately preceding process.

Continuing with the algorithm:

```
if PFC_WS0 = '1' and PFC_C_tag = '0' and PFC_C_DIX = '1'
then        PFC_C_l2Len <= "01110"; -- 14
            PFC_C_l2len14 <= '1';
            PFC_C_l2len18 <= '0';
            PFC_C_l2len22 <= '0';
            PFC_C_l2len26 <= '0';
elsif PFC_WS0 = '1' and PFC_C_tag = '0' and PFC_C_DIX = '0'
then        PFC_C_l2len <= "10110"; -- 22
            PFC_C_l2len14 <= '0';
            PFC_C_l2len18 <= '0';
            PFC_C_l2len22 <= '1';
            PFC_C_l2len26 <= '0';
elsif PFC_WS1 = '1' and PFC_C_tag = '1' and PFC_C_DIX = '1'
then        PFC_C_l2Len <= "10010"; -- 18
            PFC_C_l2len14 <= '0';
            PFC_C_l2len18 <= '1';
            PFC_C_l2len22 <= '0';
            PFC_C_l2len26 <= '0';
```

```
                              -continued elsif PFC__WS1 = '1' and PFC__C__tag = '1' and PFC__C__DIX = '0'
then      PFC__C__l2Len <= "11010"; -- 26;
          PFC__C__l2len14 <= '0';
          PFC__C__l2len18 <= '0';
          PFC__C__l2len22 <= '0';
          PFC__C__l2len26 <= '1';
elsif PFC__WS0 = '1'
then      PFC__C__l2Len <= "00000"; -- inter frame reset
          PFC__C__l2len14 <= '0';
          PFC__C__l2len18 <= '0';
          PFC__C__l2len22 <= '0';
          PFC__C__l2len26 <= '0';
else      PFC__C__l2Len <= PFC__l2Len__O;
          PFC__C__l2len14 <= PFC__l2len14__O;
          PFC__C__l2len18 <= PFC__l2len18__O;
          PFC__C__l2len22 <= PFC__l2len22__O;
          PFC__C__l2len26 <= PFC__l2len26__O;
end if;
```

The function of the above process is to compute and store the layer-2 header length. Examples of layer-2 header length are 14, 18, 22 or 26. Once the layer-2 header length is computed this indicates where the layer-3 header begins, which can be used to parse the IP header.

Continuing with the algorithm:

```
if PFC__WS0 = '1' and PFC__C__tag = '0' and hw6 = 0x800
    then PFC__C__l2IPv4 <= '1';
elsif PFC__WS1 = '1' and PFC__C__tag = '1' and hw0 = 0x800
    then PFC__C__l2IPv4 <= '1';
elsif PFC__WS1 = '1' and PFC__C__tag = '1' and hw0 < 1536 and hw1 =
    SNAPH0 and hw2 = SNAPH1 and hw3 = SNAPH2 and hw4 =
    IPV4__ETYPE
    then PFC__C__l2IPv4 <= '1';
elsif PFC__WS1 = '1' and PFC__C__tag = '0' and PFC_C__LLCaaaa =
'1' and
    hw0 = SNAPH1 and hw1 = SNAPH2 and hw2 = IPV4__ETYPE
    then PFC__C__l2IPv4 <= '1';
elsif PFC__WS0 = '1'
    then PFC__C__l2Ipv4 <= '0'; -- inter frame reset
else PFC__C__l2IPv4 <= PFC__l2IPv4__O;
end if;
```

The function of the above process is to ensure that the frame looks like an IPv4 packet from the layer-2 header perspective. A packet will look like an IP packet from layer-2 perspective, if
  Ethertype=0x0800 with or without VLAN tag
  LLC/SNAP hdr is aaaa0300000800 with or without VLAN tag Continuing with the algorithm:

```
if PFC__WS0 = '1' and PFC__C__l2len14 = '1' and hw7(15 downto 12) =
    4 and hw7(11 downto 8) >= 5
    then PFC__C__l3IPv4 <= '1';
elsif PFC__WS1 = '1' and PFC__C__l2len18 = '1' and hw1 (15 downto
    12) = 4 and hw1(11 downto 8) >= 5
    then PFC__C__l3IPv4 <= '1';
elsif PFC__WS1 = '1' and PFC__C__l2len22 = '1' and hw3(15 downto
12) = 4 and hw3(11 downto 8) >= 5
    then PFC__C__l3IPv4 <= '1';
elsif PFC__WS1 = '1' and PFC__C__l2len26 = '1' and hw5(15 downto
12) = 4 and hw5(11 downto 8) >= 5
    then PFC__C__l3IPv4 <= '1';
elsif PFC__WS0 = '1'
    then PFC__C__l3IPv4 <= '0'; --reset
else PFC__C__l3IPv4 <= PFC__l3IPv4__O;
end if;
```

The function of the above process is to ensure that the frame looks like an IPv4 packet from the layer-3 header perspective. A packet will look like an IP packet from the layer-3 perspective if IP version field in the IP header is 4 and header length field in IP header is equal to 5.

Continuing with the algorithm:

```
if PFC__WS0 = '1' and PFC__C__l2len14 = '1'
    then PFC__C__IHL <= hw7(11 downto 8);
elsif PFC__WS1 = '1' and PFC__C__l2len18 = '1'
    then PFC__C__IHL <= hw1(11 downto 8);
elsif PFC__WS1 = '1' and PFC__C__l2len22 = '1'
    then PFC__C__IHL <= hw3(11 downto 8);
elsif PFC__WS1 = '1' and PFC__C__l2len26 = '1'
    then PFC__C__IHL <= hw5(11 downto 8);
elsif PFC__WS0 = '1'
    then PFC__C__IHL <= "0000"; -- inter frame reset
else PFC__C__IHL <= PFC__IHL__O;
end if;
```

The function of the above process is to save the IP header length (in units of 4 bytes). This will provide the length of the IP header and tell where the layer-4 header (for example, TCP or UDP) begins, which is needed in order to parse layer-4.

Continuing with the algorithm:

```
if PFC__WS1 = '1' and PFC__C__l2len14 = '1' and
    hw2(13 downto 0) /= 0
    then PFC__C__IPfrag <= '1';
elsif PFC__WS1 = '1' and PFC__C__l2len18 = '1' and
    hw4(13 downto 0) /= 0
    then PFC__C__IPfrag <= '1';
elsif PFC__WS1 = '1' and PFC__C__l2len22 = '1' and
    hw6(13 downto 0) /= 0
    then PFC__C__IPfrag <= '1';
elsif PFC__WS2 = '1' and PFC__C__l2len26 = '1' and
    hw0(13 downto 0) /= 0
    then PFC__C__IPfrag <= '1';
elsif PFC__WS0 = '1'
    then PFC__C__IPfrag <= '0';
else PFC__C__IPfrag <= PFC IPfrag__O; -- inter frame reset
end if;
```

The function of the above process is to detect whether the IP packet is an IP fragment. An IP fragment is broken up during transmission such that the TCP/UDP is not coded into the layer-3 payload. If it is an IP fragment, TCP/UDP header might not be there in the layer-3 payload. The algorithm might not parse an IP fragment. To detect whether the frame is an IP fragment, access bytes numbered 6 and 7 (note, we start at 0) in the IP header. The byte structure is (Reserved)(DF)(MF)(13 bits of frag offset). If the last 14 bits are non zero, then this is a fragment.

Continuing with the algorithm:

```
if EXT__Rdy = '1'
    then PFC__C__l2l3IPv4    <= PFC__C__l2IPv4 and PFC__C__l3IPv4;
else PFC__C__l2l3IPv4        <= PFC__L2L3IPv4__O;
end if;
```

The function of the above process is to detect whether the frame is an IPv4 frame from both the layer-2 (Ethernet layer) and layer-3 (Internet layer) perspective.

Continuing with the algorithm:

```
if PFC_WS1 = '1' and PFC_C_l2len14 = '1' and hw3(7 downto 0) = 6
    then PFC_C_encIPv4prot <= "10"; -- TCP
elsif PFC_WS1 = '1' and PFC_C_l2len14 = '1' and
hw3(7 downto 0) = 17
    then PFC_C_encIPv4prot <= "11"; -- UDP
elsif PFC_WS1 = '1' and PFC_C_l2len18 = '1' and
hw5(7 downto 0) = 6
    then PFC_C_encIPv4prot <= "10"; -- TCP
elsif PFC_WS1 = '1' and PFC_C_l2len18 = '1' and
hw5(7 downto 0) = 17
    then PFC_C_encIPv4prot <= "11"; -- UDP
elsif PFC_WS1 = '1' and PFC_C_l2len22 = '1' and
hw7(7 downto 0) = 6
    then PFC_C_encIPv4prot <= "10"; -- TCP
elsif PFC_WS1 = '1' and PFC_C_l2len22 = '1' and
hw7(7 downto 0) = 17
    then PFC_C_encIPv4prot <= "11"; -- UDP
----------------------------------------------------------------
---     Step 2
----------------------------------------------------------------
elsif PFC_WS2 = '1' and PFC_C_l2len26 = '1' and
hw1(7 downto 0) = 6
    then PFC_C_encIPv4prot <= "10"; -- TCP
elsif PFC_WS2 = '1' and PFC_C_l2len26 = '1' and
hw1(7 downto 0) = 17
    then PFC_C_encIPv4prot <= "11"; -- UDP
elsif PFC_WS0 = '1'
    then PFC_C_encIPv4prot <= "00"; -- inter frame reset
else PFC_C_encIPv4prot <= PFC_encIPv4prot_O;
end if;
```

The function of the above process is to detect the layer-4 protocol payload by examining the protocol field in the IP header. This process assumes that the packet is TCP/UDP over IPv4. If the 8-bit protocol field at byte 10 of the IPv4 Header is decimal 6 then its in TCP. However, if it is decimal 17 then its in UDP.

Continuing with the algorithm:

```
if PFC_WS1 = '1' and PFC_C_l2len14 = '1'
    then PFC_C_SAh <= hw5;
elsif PFC_WS1 = '1' and PFC_C_l2len18 = '1'
    then PFC_C_SAh <= hw7;
elsif PFC_WS2 = '1' and PFC_C_l2len22 = '1'
    then PFC_C_SAh <= hw1;
elsif PFC_WS2 = '1' and PFC_C_l2len26 = '1'
    then PFC_C_SAh <= hw3;
elsif PFC_WS0 = '1'
    then PFC_C_SAh <= "0000000000000000"; -- inter frame reset
else PFC_C_SAh <= PFC_SAh_O;
end if;
```

The function of the above process is to save the IP SA (Source Address). The IP SA is 4 bytes long, and it can straddle 2 QW. So, the entire IP SA might not be received at the same time. Since layer-2 lengths are multiples of 2 and the IP SA lies on a 4-byte boundary within an IP header, the IP SA can only break at a two-byte boundary if the whole of IP SA is not received at the same time.

Continuing with the algorithm:

```
if PFC_WS1 = '1' and PFC_C_l2len14 = '1'
    then PFC_C_SAl <= hw6;
elsif PFC_WS2 = '1' and PFC_C_l2len18 = '1'
    then PFC_C_SAl <= hw0;
elsif PFC_WS2 = '1' and PFC_C_l2len22 = '1'
    then PFC_C_SAl <= hw2;
elsif PFC_WS2 = '1' and PFC_C_l2len26 = '1'
    then PFC_C_SAl <= hw4;
elsif PFC_WS0 = '1'
    then PFC_C_SAl <= "0000000000000000"; -- inter frame reset
else PFC_C_SAl <= PFC_SAl_O;
end if; In this manner, any field of the IP header can be determined.
if PFC_WS1 = '1'
    then PFC_C_SPstk <= ("00"&PFC_C_l2Len) +
        ("0"&PFC_C_IHL & "00");
elsif PFC_WS0 = '1'
    then PFC_C_SPstk <= "0000000";    -- inter frame reset
else PFC_C_SPstk <= PFC_SPstk_O;
end if;
```

The function of the above process is to get the TCP/UDP SP to LLU 306. The byte offsets (from the start of the frame) in which the hw that contains TCP/UDP SP could be several (44 in fact, 4 layer-2 hdr lengths×11 IP header lengths). In order to avoid writing if/then/else statement with 44 branches (which typically requires a large multiplexer that consumes a large space), compute a 7-bit stake where the field of interest lies. The 7-bit stake could be interpreted as (SSS)(BBBB) where S is the step number and B is the byte offset at which the field of interest could be located.

The byte-offset (stake) from the start of the frame to the hw in the TCP header contains the TCP SP, which is given by layer-2 header length+IP header length. CP SP is the start of the TCP header. In a similar manner, the stake of any field in the Layer-4 header, for example DP (Destination port) can be figured out. See FIGS. 5 and 6 for more details on offset.

The proof for using SPstk_O instead of C_SPstk is that the earliest step in which SP could be encountered is 2, while the latest step in which PFC_SPstk becomes stable is 1.

Continuing with the algorithm:

```
if EXT_Rdy = '1' and PFC_Step_O = "0"&PFC_SPstk_O(6 downto 4)
and PFC_SPstk_O(3 downto 0) = 0
    then PFC_C_SP <= hw0;
elsif EXT_Rdy = '1' and PFC_Step_O = "0"&PFC_SPstk_O(6
downto 4) and PFC_SPstk_O(3 downto 0) = 2
    then PFC_C_SP <= hw1;
elsif EXT_Rdy = '1' and PFC_Step_O = "0"&PFC_SPstk_O(6
downto 4) and PFC_SPstk_O(3 downto 0) = 4
    then PFC_C_SP <= hw2;
elsif EXT_Rdy = '1' and PFC_Step_O = "0"&PFC_SPstk_O(6
downto 4) and PFC_SPstk_O(3 downto 0) = 6
    then PFC_C_SP <= hw3;
elsif EXT_Rdy = '1' and PFC_Step_O = "0"&PFC_SPstk_O(6
downto 4) and PFC_SPstk_O(3 downto 0) = 8
    then PFC_C_SP <= hw4;
elsif EXT_Rdy = '1' and PFC_Step_O = "0"&PFC_SPstk_O(6
downto 4) and PFC_SPstk_O(3 downto 0) = 10
    then PFC_C_SP <= hw5;
elsif EXT_Rdy = '1' and PFC_Step_O = "0"&PFC_SPstk_O(6
downto 4) and PFC_SPstk_O(3 downto 0) = 12
    then PFC_C_SP <= hw6;
elsif EXT_Rdy = '1' and PFC_Step_O = "0"&PFC_SPstk_O(6
downto 4) and PFC_SPstk_O(3 downto 0) = 14
    then PFC_C_SP <= hw7;
elsif PFC_WS0 = '1'
    then PFC_C_SP <= "0000000000000000"; -- inter frame reset
else PFC_C_SP <= PFC_SP_O;
end if;
```

The function of the above process is to store a field from the TCP/UDP header. SP and DP occur at the same offsets for TCP and UDP. So, there is no need to distinguish between TCP and UDP. The stake (byte offset from the start of the frame) has been computed and stored in PFC_SPstk. When the step counter matches the ms 3 bits of the stake, the Is 4 bits specify the byte offset within the current QW of data of the TCP/UDP SP. In the same way, any field in TCP/UDP header can be stored.

Note that for the following, PFC_C_norunt is true when the number of bytes received in the current frame is equal to 64, i.e. when PFC_Step_O>4 or *(PFC_Step_O=3 and the number bytes being processed by PFC is 16). Continuing with the algorithm:

```
if PFC_C_norunt = '1' and (PFC_l2IPv4_O = '0'
or PFC_l3IPv4_O = '0')
        then PFC_C_Parsing_complete_VE92 <= '1';
elsif PFC_C_norunt = '1' and (PFC_l2IPv4_O = '1' and
PFC_l3IPv4_O = '1') and PFC_encIPv4prot_O =
ENCIPv4PROT_UNS
        then PFC_C_Parsing_complete_VE92 <= '1';
------------------------------------------------------------------
-- TCP/IPv4: Complete when SYN flag is received and no runt
-- If PFC_C_norunt = 1, then PFC 304 is processing the QW
   numbered 3.
-- Qw 0,1,2 have been received in the previous cycles.
-- This means TCP_HLflags_Stake, l2IPv4, l3IPv4,
   PFC_encIPv4prot are all
stable. Could use latch output.
------------------------------------------------------------------
elsif EXT_Rdy = '1' and
PFC_C_norunt = '1'         -- non-runt
and PFC_l2IPv4_O = '1' and PFC_l3IPv4_O = '1' and
PFC_encIPv4prot_O = ENCIPv4PROT_TCP -- TCP/IP frame
and  (PFC_Step_O > ("0"&PFC_TCP_HLflags_stake_O(6
downto 4))
        or   (PFC_Step_O = ("0"&PFC_TCP_HLflags_stake_O(6
             downto 4))
        and    (EXT_END   =   '0'   or   last_byte_stk_t   >
PFC_TCP_HLflags_stake_O(3 downto 0))))
        then PFC_C_Parsing_complete_VE92 <= '1';
------------------------------------------------------------------
-- UDP/IPv4: Complete when DP is received and no runt
-- If PFC_C_norunt = 1, then we are processing the QW numbered 3.
-- Qw 0,1,2 have been received in the previous cycles.
-- This means TCP_HLflags_Stake, l2IPv4, l3IPv4,
   PFC_encIPv4prot are all
stable. Could use latch output.
------------------------------------------------------------------
elsif EXT_Rdy = '1' and EXT_Error = '0' and
PFC_C_norunt = '1' -- non-runt
and  PFC_l2IPv4_O = '1' and PFC_l3IPv4_O = '1' and
PFC_encIPv4prot_O = ENCIPv4PROT_UDP -- UDP/IP frame and
PFC_Step_O         > ("0"&PFC_DPstk_O(6 downto 4))
        or   (PFC_Step_O = ("0"&PFC_DPstk_O(6 downto 4))
        and (EXT_END = '0' or last_byte_stk_t >
             PFC_DPstk_O(3 downto 0))))
        then PFC_C_Parsing_complete_VE92 <= '1';
elsif PFC_WS0 = '1'
        then PFC_C_Parsing_complete_VE92 <= '0'; -- Inter frame
             reset
else PFC_C_Parsing_complete_VE92<=
PFC_Parsing_complete_VE92_O;
end if;
```

Figure 6:
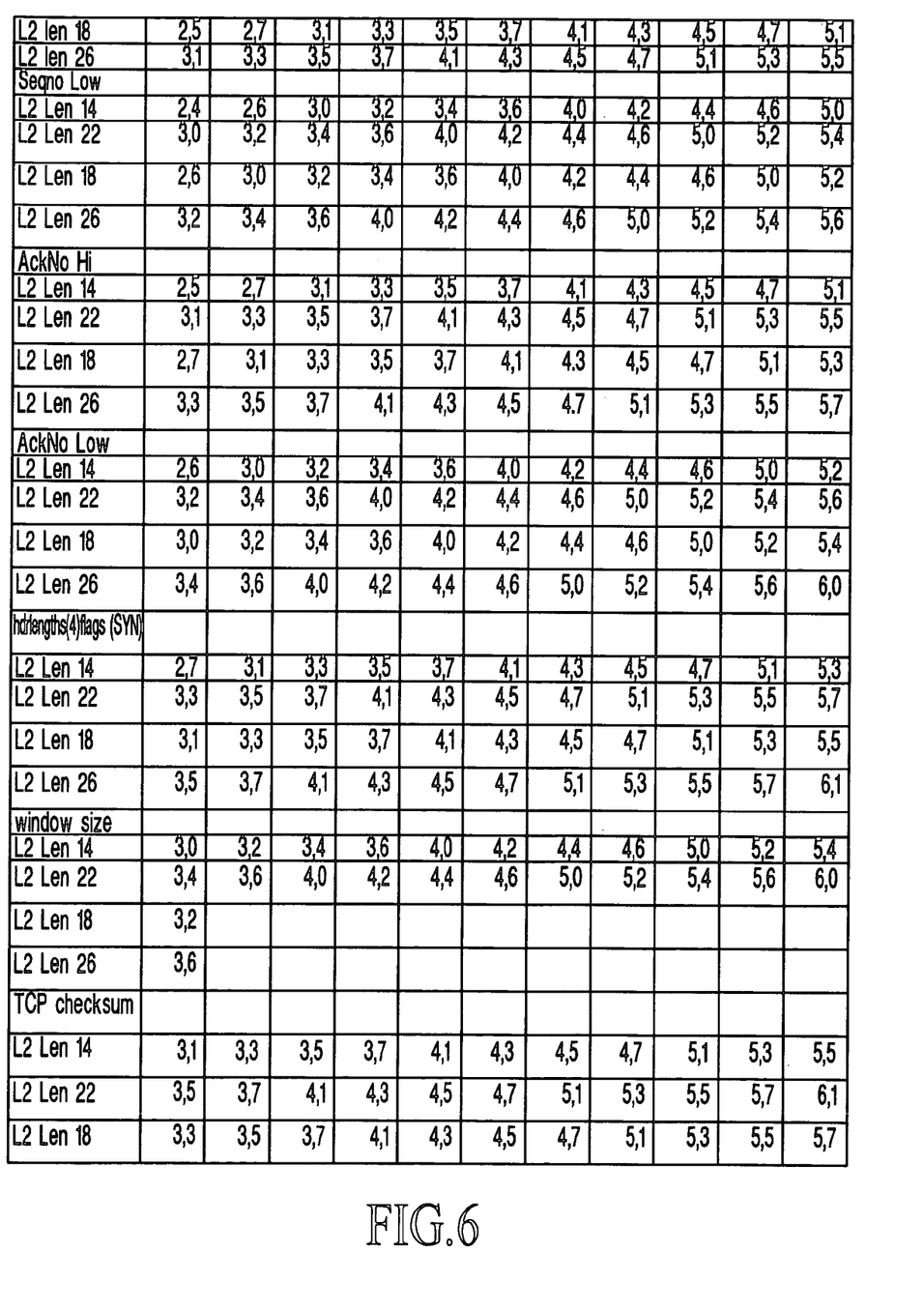
FIG. 6 is a table illustrating a continuation of TCP header field offsets as a function of layer-2 length and IP header options.

In conclusion of the parsing, the results from the PFC 304 are forwarded to the RBB 302 directly and through the LLU 306. The results may include whether or not to discard the frame, the header split length, the checksum, and VLAN swap.

Figure 5:
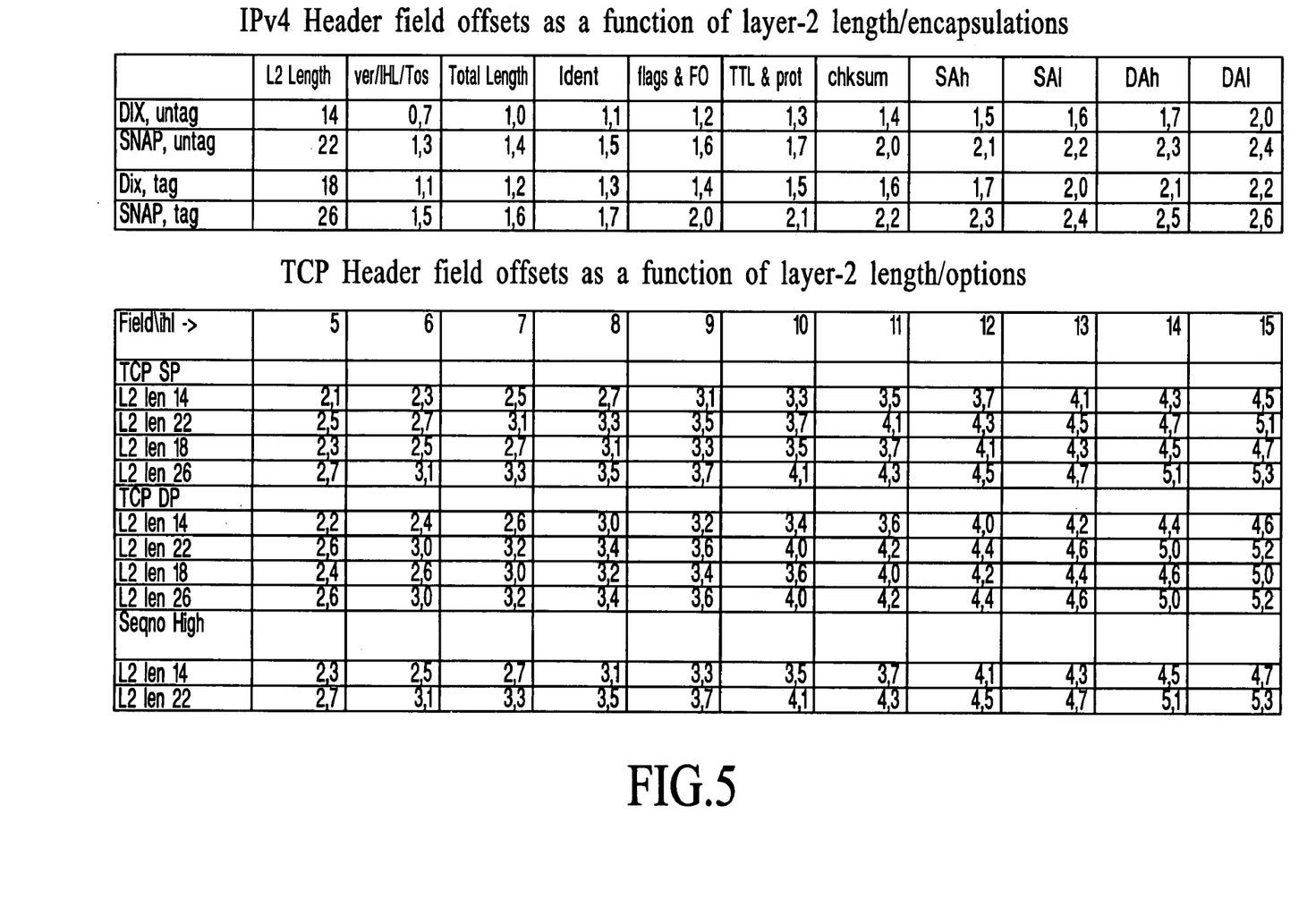
FIG. 5 is a table illustrating IPv4 header field offsets as a function of layer-2 length/encapsulations and TCP header field offsets as a function of layer-2 length and IP header options.

FIG. 5 is a table illustrating IPv4 header field offsets as a function of layer-2 length/encapsulations and TCP header field offsets as a function of layer-2 length and IP header options.

FIG. 6 is a table illustrating a continuation of TCP header field offsets as a function of layer-2 length and IP header options.

In summary, PFC 304 performs the functions of:
Packet parsing for:
  Ethernet DIX and SNAP Header
  IPv4 Header (for IP checksum validation)
  TCP header (for TCP checksum validation, Syn detection, and TCP port number)
  UDP header (for UDP checksum validation and UDP port number)
IP checksum validation
TCP packet validation
TCP checksum validation
UDP checksum validation
Blind checksum calculation
Unicast MAC destination lookup
Multicast (broadcast) MAC destination address filtering through 4K bit array
6-tuple key assembly (input to hash)
MIB counters According to the method and system disclosed herein, the present invention discloses a system and method for parsing, filtering, and computing the checksum in a HEA. One skilled in the art will recognize that the particular standards used are exemplary, and any bandwidth-limited network may apply the invention in the above manner. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for parsing, filtering, and computing a checksum using a host Ethernet adapter (HEA) coupled to a host computer, the method comprising:
  receiving a part of a frame with the HEA, wherein a plurality of parts of the frame constitute an entire frame;
  parsing the part of the frame with the HEA before receiving the entire frame;
  computing a checksum of the part of the frame with the HEA before receiving the entire frame;
  filtering, with the HEA, the part of the frame based on a logical, port-specific policy before receiving the entire frame,
  wherein a plurality of parts of the frame are received to constitute the frame, and wherein at a time when a last part of the frame is received, the parsing, filtering, and computing the checksum is performed on the last part of the frame with no additional parsing, filtering, and computing the checksum needed for the frame;
  transmitting the checksum with the HEA to the host computer; and
  during reception of one or more initial parts of the plurality of parts of the frame with the HEA, performing pre-filtering processing with the HEA including loading the logical, port specific filter policy into one or more registers of the HEA for use with the filtering.

2. The method of claim 1, wherein the parsing step comprises:
  keeping track of the part of the frame that is received; and
  determining if the frame is in a particular format, wherein the format can be any of a multicast, broadcast or unicast format.

3. The method of claim 1, wherein the pre-filtering processing is performed such that the HEA is ready to filter the part of the frame using the logical, port specific policy after a number of clock cycles of the HEA in accordance with a soonest time specified by a standard used by the HEA in receiving the parts of the frame.

4. The method of claim 3, wherein the pre-filtering processing includes:

reading a plurality of filter policies and loading the plurality of filter policies into registers of the HEA, the plurality of filter policies including a MAC filter policy, a Virtual Local Area Network (VLAN) filter policy, and the logical port specific policy, such that the HEA is ready to filter the part of the frame using the plurality of filter policies after the number of clock cycles of the HEA in accordance with the soonest time specified by the standard used by the HEA in receiving the parts of the frame; and determining a logical port destination of the frame.

5. The method of claim 1, wherein the parsing step detects a protocol payload by examining a protocol field in a header of the frame.

6. The method of claim 1, which includes forwarding results to the filtering step.

7. The method of claim 1, wherein a minimum number of portions of the frame are required to be received before the filtering of the part of the frame is performed, and wherein the pre-filtering processing is started during the reception of the initial parts of the frame and is performed and completed by the time the minimum number of portions of the frame are received.

8. The method of claim 1, wherein the filtering includes Virtual Local Area Network (VLAN) filtering.

9. The method of claim 1, wherein the filtering includes applying a different filter for each of a plurality of different logical partitions provided in a single memory storage area in a server system, wherein each of the logical partitions has different criteria to determine whether a frame is sent to that logical partition.

10. The method of claim 1 further comprising detecting whether the frame is an IP fragment indicating that the frame was broken up during transmission and a particular protocol header is not present in the frame.

11. The method of claim 1 wherein the parsing includes parsing a particular field in a header in the frame using a byte-offset stake that indicates a location of the particular field in the frame, wherein a first portion of the bits of the stake are used to indicate a particular one of the parts of the frame numbered from the beginning of the frame, and a second portion of the bits of the stake determines a byte offset within the particular part of the frame.

12. A host Ethernet adapter (HEA) coupled to a host computer, the HEA for parsing, filtering, and computing a checksum, the system comprising:

a mechanism for receiving a part of a frame, wherein a plurality of parts of the frame constitute an entire frame;

a parser for parsing the part of the frame before receiving the entire frame;

a mechanism for computing a checksum of the part of the frame before receiving the entire frame;

a mechanism for filtering the part of the frame based on a logical, port-specific policy before receiving the entire frame, wherein a plurality of parts of the frame are received to constitute the frame, and wherein at a time when a last part of the frame is received, the parser, the mechanism for filtering, and the mechanism for computing the checksum perform parsing, filtering, and computing the checksum, respectively, on the last part of the frame with no additional parsing, filtering, and computing the checksum needed for the frame;

a mechanism for transmitting the checksum to the host computer; and a mechanism for performing pre-filtering processing during reception of one or more initial parts of the plurality of parts of the frame, the pre-filtering processing including loading the logical, port specific filter policy into one or more registers of the HEA for use with the filtering.

13. The host Ethernet adapter of claim 12, wherein the pre-filtering processing is performed such that the mechanism for filtering is ready to filter the part of the frame using the logical, port specific policy after a number of clock cycles of the HEA in accordance with a soonest time specified by a standard used by the HEA in receiving the parts of the frame.

14. The host Ethernet adapter of claim 12, wherein the parser keeps track of the part of the frame that is received and determines if the frame is in a particular format.

15. The host Ethernet adapter of claim 14, wherein the format can be any of a multicast, broadcast or unicast format.

16. The host Ethernet adapter of claim 12, wherein a minimum number of portions of the frame are required to be received before the mechanism for filtering filters the part of the frame, and wherein the filtering initialization is started during the reception of the initial parts of the frame and is performed and completed by the time the minimum number of portions of the frame are received.

17. The host Ethernet adapter of claim 12, wherein the mechanism for performing pre-filtering processing reads a plurality of filter policies and loads the plurality of filter policies into registers of the HEA, the plurality of filter policies including a MAC filter policy, a Virtual Local Area Network (VLAN) filter policy, and the logical port specific policy, and wherein the mechanism for performing pre-filtering processing determines a logical port destination of the frame.

18. The host Ethernet adapter of claim 12, wherein the mechanism for filtering applies a different filter for each of a plurality of different logical partitions provided in a single memory storage area in a server system, wherein each of the logical partitions has different criteria to determine whether a frame is sent to that logical partition.

19. The host Ethernet adapter of claim 12 further comprising a mechanism for detecting whether the frame is an IP fragment indicating that the frame was broken up during transmission and a particular protocol header is not present in the frame.

20. The host Ethernet adapter of claim 12 wherein the parser parses a particular field in a header in the frame using a byte-offset stake that indicates a location of the particular field in the frame, wherein a first portion of the bits of the stake are used to indicate a particular one of the parts of the frame numbered from the beginning of the frame, and a second portion of the bits of the stake determines a byte offset within the particular part of the frame.

* * * * *